April 12, 1938. H. FISCHER 2,113,881
INJECTION ENGINE
Filed Jan. 21, 1937 4 Sheets-Sheet 1

Inventor:
Hans Fischer
By: Brown, Jackson, Boettcher & Dienner
Attys.

April 12, 1938. H. FISCHER 2,113,881
INJECTION ENGINE
Filed Jan. 21, 1937 4 Sheets-Sheet 2
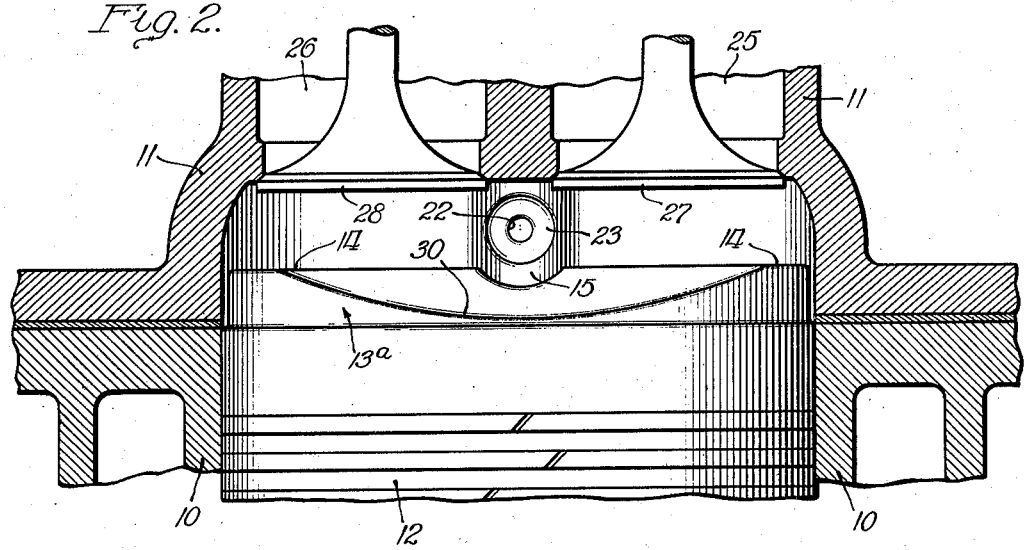
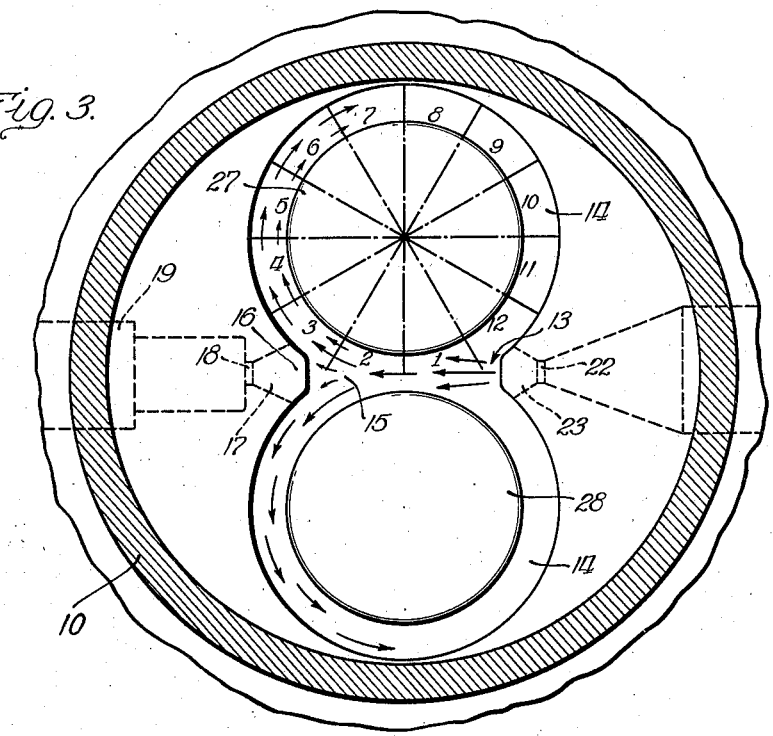
Inventor:
Hans Fischer April 12, 1938.  H. FISCHER  2,113,881
INJECTION ENGINE
Filed Jan. 21, 1937   4 Sheets-Sheet 4

Inventor:
Hans Fischer

Patented Apr. 12, 1938

2,113,881

UNITED STATES PATENT OFFICE 2,113,881

INJECTION ENGINE

Hans Fischer, Crestwood, N. Y., assignor to Lanova Corporation, New York, N. Y., a corporation of Delaware Application January 21, 1937, Serial No. 121,417

4 Claims. (Cl. 123—32)

This invention relates to injection engines, and has to do with injection engines of the air storage chamber type.

In an injection engine, the rate of burning of the fuel mixture determines the efficiency of the combustion, and, therefore, the output of the engine. Theoretically, the burning of the entire fuel mixture charge while the piston is in its upper or inner dead center position would give maximum efficiency, but this is not feasible for practical reasons, due to the sudden and excessively high pressures which would be produced.

Air storage chamber injection engines in which the combustion chamber is of approximately figure 8 shape in plan, and the fuel is injected at one side of the constriction of the combustion chamber in a stream toward a funnel shaped passage at the opposite side, leading to a restricted orifice of an air storage chamber, are known in the art. In the usual engine of this type, the lobes of the combustion chamber are of cylindrical shape and uniform height, and the inner or upper face of the piston is flat and normal to the cylinder axis. If it be assumed that the fuel mixture travels along the walls of the lobes at constant velocity, the amount of air in these lobes intermixed with fuel in equal time intervals would, in theory, be constant, and therefore the rate of combustion during the combustion period would also be constant. Practically, however, the velocity of the fuel mixture diminishes somewhat, the further it travels along the walls of the lobes, because of friction, and therefore the rate of combustion is also correspondingly diminished.

I have found by experiment and practice that it is highly desirable to effect the major portion of the combustion during the early portion of the combustion period, and in order to accomplish this it is necessary that a large proportion of the total air available in the lobes to support combustion be made available during the early part of the combustion period, rather than at a nearly uniform rate, as is customary in the usual air storage chamber type of engine. I have further found that this highly desirable result can be attained by properly placing the combustion supporting air within the combustion chamber, so that the volume available in relation to the path of travel of the fuel mixture and blast of incandescent gas ejected through the orifice of the air storage chamber will result in the major portion of the combustion occurring in a much shorter period of time than is possible in the usual type of air storage chamber engine referred to.

The instant invention is in the nature of an improvement of the engine disclosed in my copending application for Injection engine, Serial No. 75,343, filed April 20, 1936.

It is the primary object of my invention to provide an engine of the character stated which avoids the above noted objections to the referred to known type of air storage chamber injection engine. Broadly, my invention is directed to an engine of the character referred to which renders possible burning the maximum amount of fuel while the piston is at or close to its inner or upper dead center position, while also maintaining the peak pressure within practical limits.

A further and more specific object is so to relate the combustion chamber and the air storage chamber orifice, and associated features, that the fuel mixture is caused to flow through a predetermined path within the combustion chamber, the latter increasing in volume, for a considerable portion of its extent, in the direction of flow of the fuel mixture. In its broader aspects, my invention is directed to causing flow of the fuel mixture, during combustion, in a predetermined path through a body of combustion supporting air which increases in amount available for combustion in the direction of travel of the mixture. More specifically, the instant invention is directed to certain novel features of construction of the combustion chamber and the piston, which cooperate to attain the above stated objects.

Further objects and advantages will appear from the detailed description.

In the drawings:

Figure 2 is a vertical axial sectional view through the upper end portion of the engine, in substantially the plane of line 2—2 of Figure 1;

Figure 3 is a section taken substantially on line 3—3 of Figure 1, the piston being omitted and parts being broken away;

Figure 8:
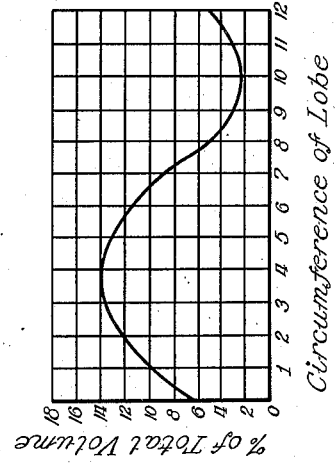
Figure 8 is a graphical illustration of a development of one of the lobes of the combustion chamber of the engine shown in Figures 6 and 7, showing approximately the relative volumes of the different portions of the lobe.

The engine comprises a cylinder 10, water-jacketed in a known manner, which cylinder is closed at its upper end by a head 11, also water-jacketed and removably secured to the cylinder in a known manner. A piston 12 operates within the cylinder. The underface of head 11 is flat or planar, and is disposed normal to the cylinder axis a—a. A combustion chamber 13 is formed in head 11 and overlies and opens downward into the cylinder area. This combustion chamber is of approximately figure 8 shape in plan, and comprises two circular lobes 14 and a constriction 15 therebetween defining, at one side, a point element 16 of approximately V-shape. Element 16 is provided with an opening 17 flaring inward of the combustion chamber from an orifice 18 with which is aligned the port of a single port fuel injection nozzle 19, of known type, mounted in a suitable manner in a sleeve 20 formed integrally with cylinder head 11. An air storage chamber 21 is formed integrally with head 11 at the opposite side of constriction 15 and opens into the latter through a restricted orifice 22 and a funnel-shaped passage 23 leading from this orifice and flaring inward of the combustion chamber. Preferably, orifice 22 is so disposed that the axis thereof, indicated by the line c—c, which is also the lengthwise axis of chamber 21, intersects point element 16 below the orifice 18 thereof. The port of injection nozzle 19 is coaxial therewith, and the axis of the nozzle, indicated by the line d—d, passes through orifice 22 centrally thereof. The injection nozzle port is thus disposed in substantial alignment with orifice 22 of the air storage chamber, and is spaced therefrom considerably less than the diameter of cylinder 10, as shown, and direct impingement against the injection nozzle, adjacent the port thereof, of the hot blast ejected from the air storage chamber, to be later referred to more in detail, is avoided.

The air storage chamber 21 is shown as of elongated ovoidal shape, with the orifice 22 disposed at its smaller end or point. It will be understood, however, that this chamber may be otherwise formed and of any suitable construction. Conveniently, the outer or base portion of the chamber is formed, in part, by a removable plug 24, screwed or otherwise suitably secured in head 11, the inner end of this plug being suitably recessed to define the outer portion of the interior of the chamber 21.

Cylinder head 11 is also provided with inlet and exhaust passages 25 and 26, respectively, controlled by inlet and exhaust valves 27 and 28, respectively, the axes of these valves being parallel to the cylinder axis a—a. The roof of the combustion chamber is flat and is normal to the cylinder axis, as shown.

Piston 12 is provided at its upper end with a projection 13a which, in plan, substantially conforms to the combustion chamber 13. Projection 13a is provided, at each end thereof, with a segmental element 14a of circular curvature in plan, and, between elements 14a, with a depression 30 of substantially V-shaped in plan and flaring toward point element 16 of the combustion chamber. Depression 30 is inclined downward and increases in depth toward its wider portion, this depression also being of arcuate shape at its wider portion and increasing in depth from each end to its center, where it is of maximum depth, as will be clear from Figure 2.

Figure 1:
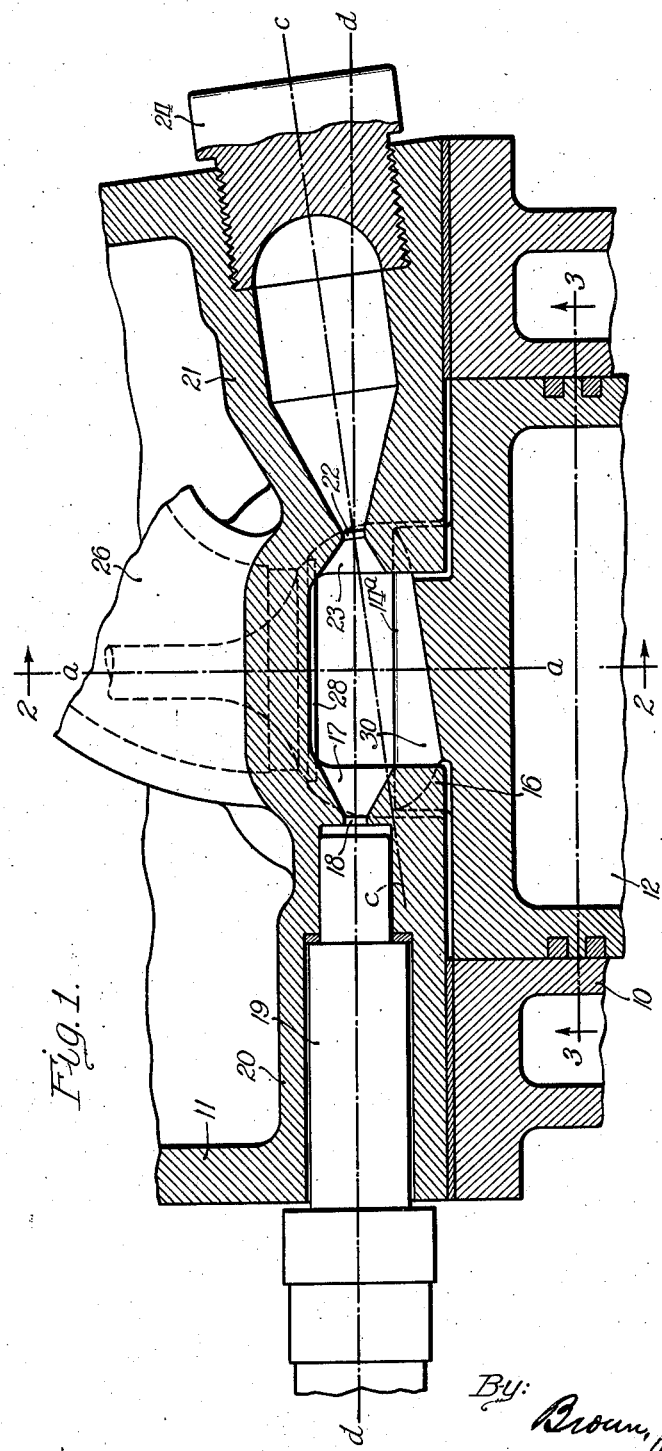
Figure 1 is a vertical axial sectional view through the upper end portion of an engine embodying my invention, showing the portions thereof with which my invention is concerned, some parts being shown in elevation.

When the piston 12 is in its inner dead center position, or position of maximum compression, shown in Figure 1, projection 13a thereof defines, with the combustion chamber, a primary combustion space in which each of the lobes 14 increases in height, and therefore in volume, from the side thereof adjacent orifice 22 to its other side adjacent point element 16. It will also be noted that each of the lobes decreases in effective height from the point element 16 toward the elements 14a of projection 13a of the piston, so that the major portion of the volume of air within the primary combustion space is adjacent the point element 16. This will be clear from Figures 1 and 2, and will be explained more in detail with reference to Figures 3 and 5.

Figure 5:
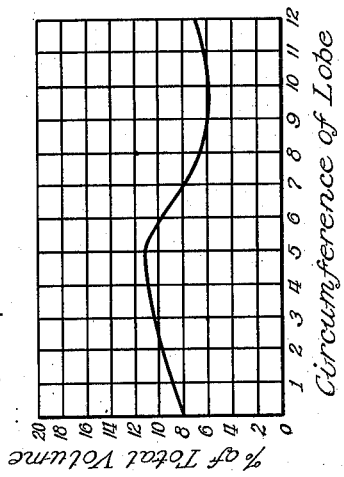
Figure 5 is a graphical illustration of a development of one of the lobes of the combustion chamber, showing approximately the relative volumes of the different portions thereof.
Figure 4:
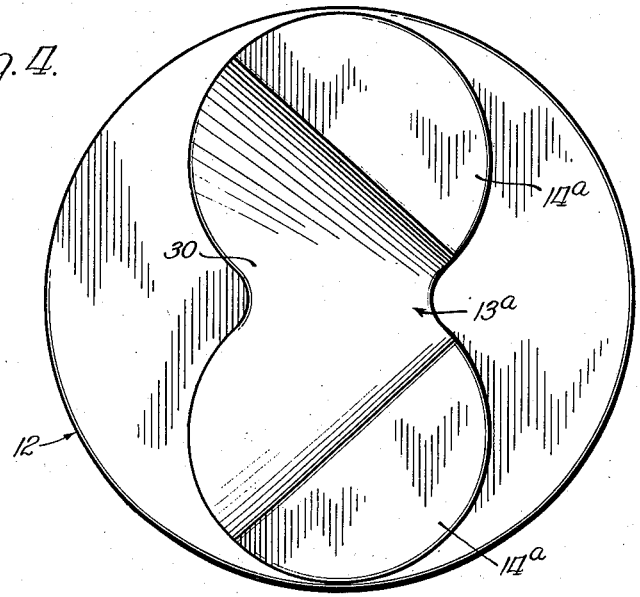
Figure 4 is a plan view of the piston.

In Figure 3, one of the lobes 14 is shown as divided into a plurality of equal sectors numbered consecutively from 1 to 12. In Figure 5, the development of the corresponding lobe of the primary combustion space, when the piston is in its position of maximum compression, is applied to a graph on which the abscissae represents the sectors of the lobe and the ordinates represent the volume of the sectors in per cent of the total volume of the lobe. It will be noted from Figure 5 that the volume of sector 1 of the lobe is relatively small, increases to sector 5, where it is maximum, then decreases to sector 10, from there increasing slightly to sector 12. In general, it may be said that the volume of the lobe of the primary combustion space increases from the side thereof adjacent orifice 22 of the air storage chamber to the other side adjacent point element 16.

During the compression stroke of the piston, air is forced into the chamber 21 and is there stored under a pressure lower than that in the combustion chamber by the amount of the pressure drop through orifice 22. The major portion of the air charge is compressed within the lobes of the combustion chamber. As the piston approaches the top of its upstroke, injection of fuel is initiated, being continued until the piston has moved a predetermined distance on its down stroke, as is known. During the continued upward movement of the piston, and prior to ignition, an appreciable amount of the injection fuel enters the air storage chamber 21 through orifice 22, due to the relation between the port of injection nozzle 19 and passage 23, flow of fuel into chamber 21 also being encouraged by flow of air into this chamber in the upward movement of the piston. The piston continues its upward movement until the fuel in the combustion chamber is ignited by the heat of compression, which ignition in turn ignites the fuel in the air storage chamber 21. The combustion of the fuel in air storage chamber 21 results in an abrupt and great increase in pressure therein, with the result that a high pressure high velocity incandescent gas blast is ejected from chamber 21 through orifice 22 in opposition to the injected fuel stream. The high velocity incandescent gas stream ejected through orifice 22 effectively disburses and atomizes the fuel stream, the resulting mixture being driven back toward the point element 16. This element serves to split the high velocity stream of fuel and incandescent gas into two portions and to divert the same into the lobes 14 of the combustion chamber, thus causing the fuel mixture to flow along the walls of these lobes in a predetermined path, as indicated by the arrows in Figure 3. While an appreciable amount of burned gas is produced in the air storage chamber 21 by the auxiliary combustion therein, and is ejected from it, the main air charge, which forms the main body of combustion supporting air, is within the lobes of the combustion chamber. Accordingly, the incandescent gas blast ejected through orifice 22 pushes the fuel stream from injection nozzle 19, together with the rich fuel air mixture surrounding it, in such direction that the ensuing mixture first enters the portion of the lobes of greatest volume, where the greatest amount of air is available for combustion, and thence flows toward the areas of the lobes containing gradually decreasing volumes of air available for combustion. By directing the fuel mixture in this manner, by means of the blast from the air storage chamber, I assure that a relatively large portion of the fuel will be burned during the first part of the combustion period, that is, while the piston is at or about its upper dead center position, which contributes materially to the efficiency of the engine. Since the peak pressure and the rate of pressure rise are functions of the rate of combustion, the combustion air within the respective lobes of the combustion chamber is so distributed, in the manner above described, as to assure practically complete use of all of the fuel while avoiding objectionably high pressures incident to combustion.

Having the roof of the combustion chamber flat and normal to the cylinder axis is advantageous as facilitating mounting of the valves and the controlling and operating means therefor. The provision of the projection 13a on the piston renders it possible, by using pistons having projections of different extents, to vary the effective volume of the primary combustion space, in the position of maximum combustion of the piston, when using a given combustion chamber. This renders possible considerable variation in the total effective volume of the primary combustion space, to suit the particular engine, which is often of considerable importance from the standpoint of efficiency.

Figure 7:
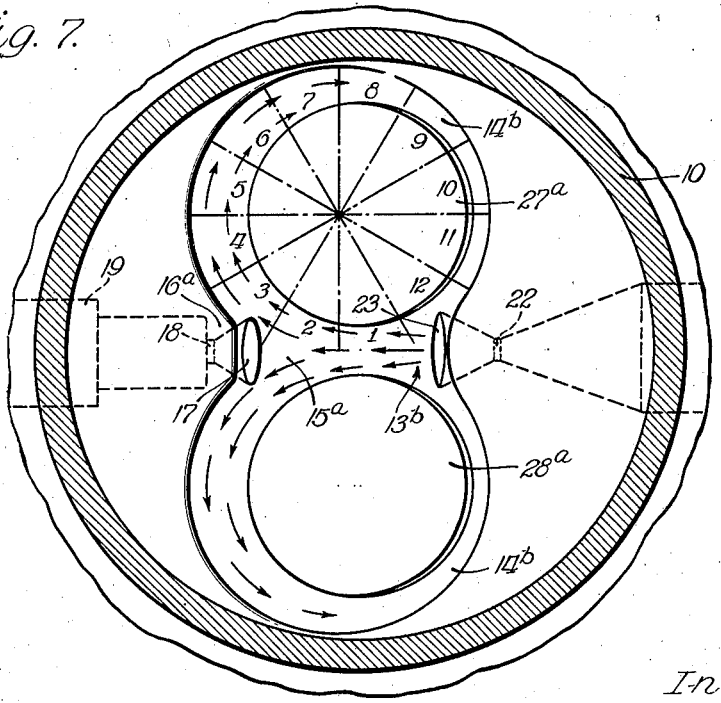
Figure 7 is a sectional view taken substantially on line 7—7 of Figure 6, with the piston omitted and parts broken away.
Figure 6:
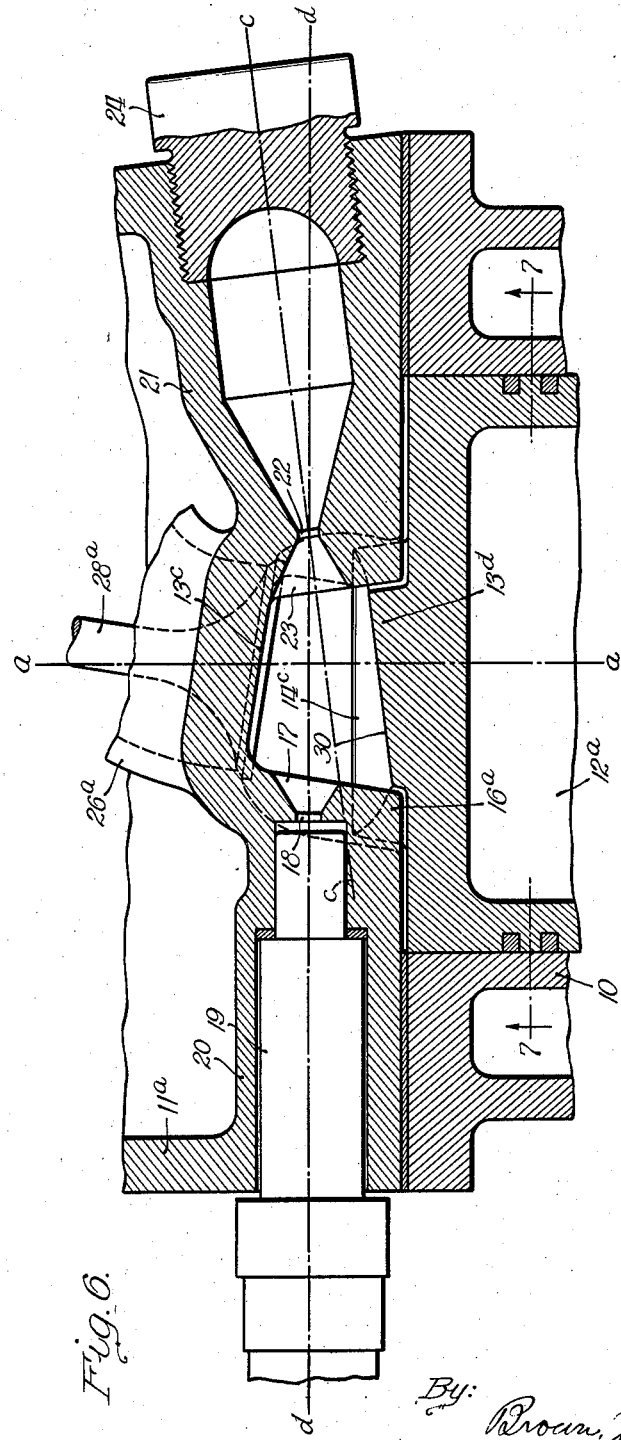
Figure 6 is a view similar to Figure 1 of a modified form of engine embodying my invention.

In the modified form of engine illustrated in Figures 6 and 7, roof 13c of combustion chamber 13b is flat and inclined upward from the side thereof adjacent orifice 22 of the air storage chamber 21, the axes of inlet and exhaust valves 27a and 28a, respectively, are inclined to the cylinder axis a—a, and projection 13d of piston 12a, including the elements 14c, is slightly tapered upward, point element 16a adjacent the injection nozzle 19 being inclined upward and inward of the combustion chamber and the element at the opposite side of the constriction 15a, through which passage 23 opens, being also inclined upward and inward of the combustion chamber. In other respects, the construction and operation of the engine of Figures 6 and 7 are similar to the construction and operation of the engine of Figures 1 to 4, inclusive.

When piston 12a is in its position of maximum compression, projection 13d thereof defines, with the combustion chamber 13b, a primary combustion space in which the height of the lobes 14b increases toward the point element 16a. The rate of increase in height of the lobes is materially greater than in Figures 1 to 4, inclusive, with corresponding rate of increase in volume of air available for combustion. This will be clear from Figure 8 in which it will be noted that the volume increases rapidly from segment 1 to segment 4, where it becomes maximum, decreases to segment 10, and then increases slightly to segment 12. As a result, in the engine of Figures 6 and 7, a greater proportion of the combustion occurs when the piston is at or about its inner dead center position—that is, its position of maximum compression, than in the engine of Figures 1 to 4, inclusive, with resulting increase in efficiency. Slanting of the roof of the combustion chamber in the manner described is thus advantageous as contributing to increased efficiency of the engine.

As above indicated, and as will be understood by those skilled in the art, changes in construction and arrangement of parts of the invention may be resorted to without departing from the field and scope of the same, and I intend to include all such variations, as fall within the scope of the appended claims, in this application in which the preferred forms only of my invention have been disclosed.

What I claim is:

1. In an injection engine, a cylinder and a piston operating therein, a main combustion chamber overlying and opening into the cylinder area, said chamber comprising in plan a constriction and substantially circular lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said constriction defining at said opposite side thereof a point element effective for splitting a fluid stream ejected through said orifice toward said element and for diverting the portions of the split stream into said lobes, said piston being provided at its upper end with a depression defining with said combustion chamber, when the piston is in its position of maximum compression, a primary combustion space increasing in height and volume from the side thereof adjacent said orifice toward the side thereof adjacent said element.

2. In an injection engine, a cylinder and a piston operating therein, a main combustion chamber overlying and opening into the cylinder area, said chamber comprising in plan a constriction and substantially circular lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said constriction defining at said opposite side thereof a point element effective for splitting a fluid stream ejected through said orifice toward said element and for diverting the portions of the split stream into said lobes, said piston being provided at its upper end with a projection substantially conforming in plan to said combustion chamber having a depression increasing in width and depth toward said point element, said depression being symmetrical with respect to the constriction of said projection, of maximum depth and volume at said constriction, and decreasing in depth and volume toward each end.

3. In an injection engine, a cylinder and a piston operating therein, a main combustion chamber overlying and opening into the cylinder area, said chamber comprising in plan a constriction and substantially circular lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said constriction defining at said opposite side thereof a point element effective for splitting a fluid stream ejected through said orifice toward said element and for diverting the portions of the split stream into said lobes, the roof of said combustion chamber being flat and normal to the cylinder axis, said piston being provided at its upper end with a projection substantially conforming in plan to said combustion chamber having a depression increasing in width and depth toward said point element, said depression being symmetrical with respect to the constriction of said projection, of maximum depth and volume at said constriction, and decreasing in depth and volume toward each end.

4. In an injection engine, a cylinder and a piston operating therein, a main combustion chamber overlying and opening into the cylinder area, said chamber comprising in plan a constriction and substantially circular lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said constriction defining at said opposite side thereof a point element effective for splitting a fluid stream ejected through said orifice toward said element and for diverting the portions of the split stream into said lobes, the roof of said combustion chamber being flat and inclined upward from the side thereof adjacent said orifice, said piston being provided at its upper end with a projection substantially conforming in plan to said combustion chamber having a depression increasing in width and depth toward said point element, said depression being symmetrical with respect to the constriction of said projection, of maximum depth and volume at said constriction, and decreasing in depth and volume toward each end.

HANS FISCHER.